May 20, 1969     R. J. SMITH     3,444,755
REMOTE CONTROL APPARATUS
Filed May 16, 1967
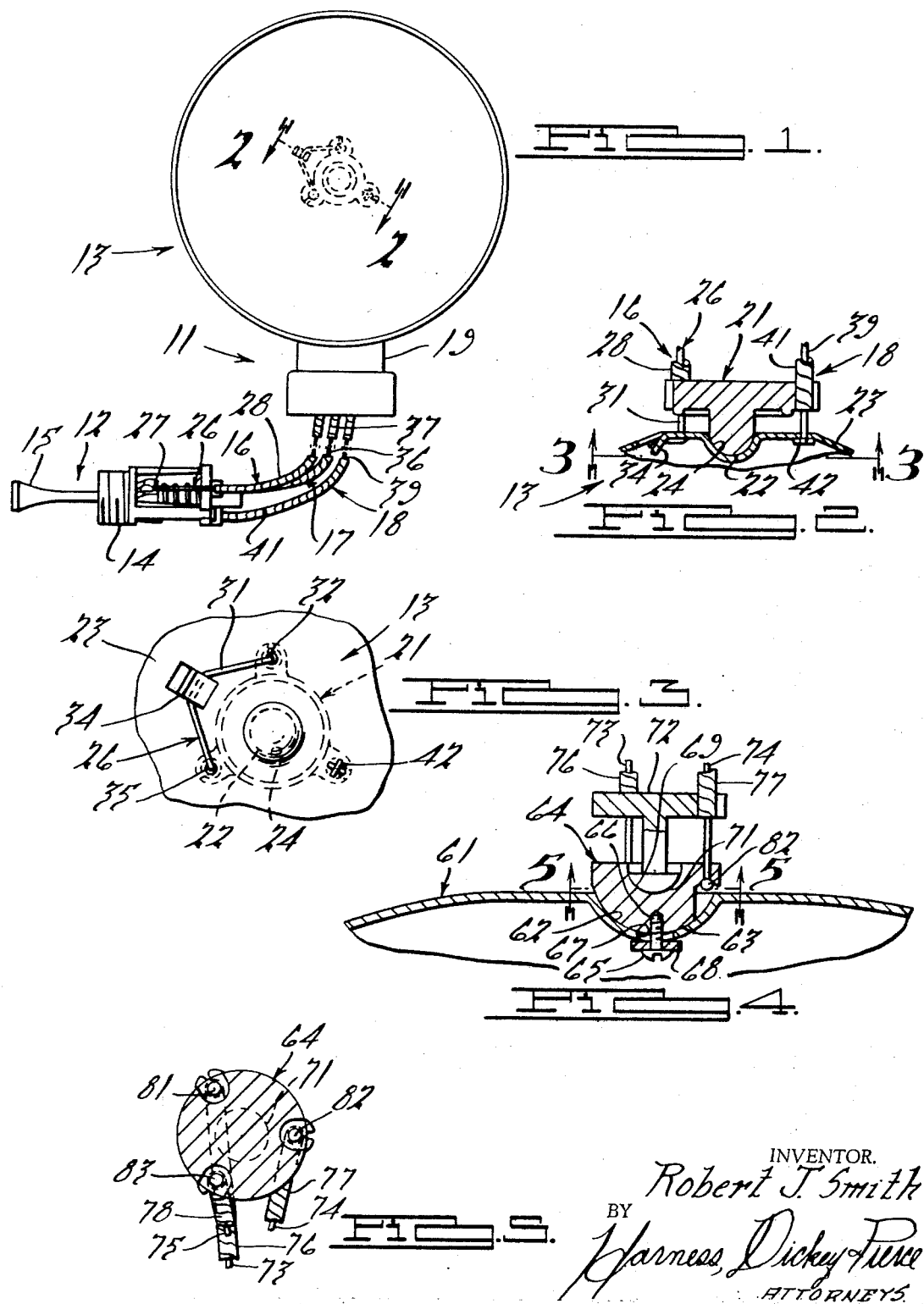
INVENTOR.
Robert J. Smith
BY Harness, Dickey & Pierce
ATTORNEYS United States Patent Office 3,444,755
Patented May 20, 1969

1

3,444,755
REMOTE CONTROL APPARATUS
Robert J. Smith, Farmington, Mich., assignor to C. M.
Hall Lamp Company, a corporation of Michigan
Filed May 16, 1967, Ser. No. 638,803
Int. Cl. F16c 1/10
U.S. Cl. 74—501          17 Claims

ABSTRACT OF THE DISCLOSURE

A remote controlled, automotive rear view mirror and particularly two embodiments of such devices that facilitate automatic adjustment in the relationship between the control lever and the mirror. In each embodiment, the control lever is connected to the mirror by means of a plurality of flexible wire actuator assemblies so that angular movement of the control lever results in concurrent angular movement of the mirror. An automatic release or slip connection is provided between at least one of the flexible transmitters and the mirror so that normal control signals will be transmitted from the control lever to the mirror, and yet adjustment may be conveniently made if either the lever or the mirror reaches its extreme position before the other member is in its extreme position.

Background of the invention

This invention relates to a remote control apparatus and more particularly to a remote control apparatus for transmitting a control signal from a control member to a controlled member and for adjusting the relationship between the members.

Various types of remote control devices have been provided for permitting adjustment of the position of an article by a remotely located control member. Frequently, these remote control devices comprise preassembled components that are installed as a unit. A typical example of this type of device is the remote control outside rear view mirror used on many modern motor vehicles. Such mirrors consist of a mirror assembly that is mounted on the outside sheet metal of the vehicle, a control lever assembly that extends into the passenger compartment of the vehicle and a flexible transmitter assembly that connects the control lever with a mirror. These mirrors are preassembled units and the flexible transmitters and control lever are threaded through apertures in the body sheet metal upon installation. Frequently, due to either incorrect installation, variations in installation procedures or manufacturing deviations, the installed mirror does not provide the desired range of movement. That is, a given angular movement of the control lever may not accomplish the desired overall movement of the mirror since one of these members may reach its extreme position before the other member does. Although it is possible to provide some structure for permitting disconnection of the flexible transmitters from either the control lever or the mirror to effect adjustment, such adjustments can be time consuming and are not entirely satisfactory.

It is, therefore, a principal object of this invention to provide a remote control device that may be automatically adjusted.

It is a further object of the invention to provide an automatically adjustable remote control rear view mirror.

It is another object of this invention to provide an improved structure for adjusting the relationship between the control member and controlled member of a remote control device.

Summary of the invention

A remote control device embodying this invention is particularly adapted for transmitting a control signal from

2 a control member to a controlled member and for automatically adjusting the relationship between the members. The remote control device comprises motion transmitting means having an input end and an output end. First coupling means connect the input end of the motion transmitting means to the control member, and second coupling means connect the output end of the motion transmitting means to the controlled member. The coupling means and the motion transmitting means are effective to transmit control movement from the control member to the controlled member. At least one of the coupling means connects the respective ends of the motion transmitting means and the respective member for simultaneous control movement until one of the members reaches an extreme position in its travel. The coupling means is then operative to automatically uncouple the respective end of the motion transmitting means from the respective member when the one member is in its extreme position and upon continued movement of the other member to its respective extreme position for relative movement between the respective end and the respective member upon the continued movement for adjusting the relationship between the members.

Brief description of the drawings

FIGURE 1 is an elevational view of a remote controlled automotive rear view mirror embodying this invention and oriented as it would appear as installed in a vehicle.

FIGURE 2 is an enlarged cross-sectional view taken along the line 2—2 of FIGURE 1.

FIGURE 3 is an elevational view looking in the direction of the arrow 3—3 in FIGURE 2.

FIGURE 4 is a cross-sectional view, in part similar to FIGURE 2, showing another embodiment of the invention.

FIGURE 5 is a cross-sectional view taken along the line 5—5 of FIGURE 4.

Detailed description of the preferred embodiments

Referring now in detail to the embodiment shown in FIGURES 1 through 3, a remote control, automotive rear view mirror unit embodying this invention is identified generally by the reference numeral 11. The mirror unit 11 is comprised of a control assembly 12 that is adapted to extend, in part, into the interior of the associated motor vehicle and a remotely positioned mirror head assembly 13 that is adapted to be supported on the exterior sheet metal of the vehicle. The control assembly 12 is comprised of a mounting base 14 that supports a control lever 15 for universal pivotal movement in any known manner. A plurality of flexible transmitter assemblies 16, 17 and 18 are associated with the control assembly 12 in a manner which will become more apparent as this description proceeds for controlling the angular position of the mirror glass of the mirror head assembly 13.

The mirror head assembly 13 is comprised of a mounting bracket 19 that is adapted to be fixed in any known manner to the exterior sheet metal of the vehicular body and through which one end of the flexible transmitter assemblies 16, 17, 18 extend. The upper end of the mounting bracket 19 is connected in any known manner to a supporting member, indicated generally by the reference numeral 21. The supporting member 21 defines rearwardly extending projection 22 having a surface that is a segment of a sphere and which forms a ball of a ball and socket connection for pivotally supporting a mirror head. The mirror head is comprised of a sheet metal frame member 23 having a central portion defining a hemispherical socket cavity 24 that is journaled upon the supporting member portion 22 in a known manner. The outer periphery of the frame member 23 is connected in any known manner to a mirror glass so that the mirror glass is supported for universal pivotal movement upon the mounting bracket 19.

The details of the construction of the elements thus far described form no part of the invention and reference may be had to my Patent No. 3,195,370, entitled "Remote Control Unit" issued July 20, 1965, for specifics as to the construction of these components. In addition, certain of the inventive features described herein may find application in other types of remote control devices than automotive rear view mirrors.

In the normal remote control device of this type, all of the components are preadjusted prior to installation. Frequently either manufacturing variations or variations in installation procedure cause a variation in the angular relationship between the control lever 15 and the mirror glass. That is, when installed the control lever may not be in its neutral position at the same time the mirror glass is in its neutral position. Thus, angular movement of the control lever 15 to one extreme position either will not move the mirror glass to its extreme angular position or the mirror glass will reach its extreme angular position prior to movement of the control lever 15 to its extreme angular position. The connection between the flexible transmitter assemblies 16, 17 and 18 and the mirror frame 23, now to be described, permits automatic adjustment under the circumstances.

The flexible transmitter assemblies 16 and 17 are comprised of a common flexible wire actuator, indicated generally by the reference numeral 26 that has one of its ends rigidly connected to the control lever 15 at a point spaced from its pivot point, in any known manner, as at 27. A major portion of the length of the wire 26 forming the transmitter assembly 16 is covered by a flexible protective sheath 28. The upper end of the sheath 28 is rigidly affixed to the supporting member 21 in any known manner, and an intermediate portion 31 of the wire actuator 26 extends beyond the supporting member 21 toward the mirror frame 23. The actuator intermediate portion 31 passes through a circular guide member or opening 32 in the mirror frame 23 and extends across a portion of the mirror frame 23 on the side adjacent the mirror glass. The actuator portion 31 is staked with respect to the mirror frame 23 by means of a tab 34 that is struck integrally from the mirror frame 23 and which frictionally engages the wire actuator portion 31. Actuator portion 31 extends back through the mirror frame 23 through a guide opening 35 that is spaced circumferentially from the guide opening 32 at substantially the same radial distance from the pivot point of the mirror glass upon the supporting member portion 22. A return portion 36 of the actuator 26 extends back toward the control assembly 12 and is encircled by a protective sheath 37 which completes the flexible transmitter assembly 17. The upper end of the sheath 37 is affixed to the supporting member 21 in a known manner and the opposite end of the wire actuator 26 is affixed to the control lever 15 at a point circumferentially spaced from the end portion attachment 27.

The flexible transmitter assembly 18 is comprised of a wire actuator 39 and a surrounding protective sheath 41. One end of the wire actuator 39 is connected to the lever 15 at a point spaced circumferentially from the connection of the opposite ends of the wire actuator 26 with the lever 25. The other end of the wire actuator 39 is affixed to the mirror frame 23, as by a fastener 42 (FIGURE 2), at a point circumferentially spaced from the guide openings 32 and 35.

As is well known, angular movement of the control lever 15 will be transmitted through the respective flexible transmitter assemblies 16, 17 and 18 to accomplish angular adjustment of a mirror glass. The frictional engagement between the tab 34 and the wire actuator portion 31 is sufficiently tight to preclude any relative movement between the actuator portion 31 and mirror frame 23 during normal control movement and the device will act as a conventional three wire controlled mirror. The structure may be adjusted, however, upon installation in the event the central position of the control lever 15 does not coincide with the central position of the mirror glass. In this instance, the control lever 15 will not reach an extreme angular position in its movement prior to or at the same point at which the mirror glass 24 reaches its corresponding extreme angular position. Under these circumstances, continued movement of the control lever 15 will exert a force on the respective end of the wire actuator 26 that exceeds the resistive force of the frictional engagement of the tab 34 with the wire portion 31. Under these conditions, the wire actuator 26 will slip with respect to the tab 34 so that the control lever 15 may be moved to its extreme angular position while the mirror glass remains in its extreme angular position. Subsequent to this action, the mirror glass will be appropriately adjusted with respect to control lever 15. Upon installation, complete adjustment may be readily effected by rotating the control lever 15 to each of its extreme angular positions with respect to its supporting pivot point. If sufficient force is exerted during this manipulation, the mirror glass will be automatically adjusted with respect to the control lever 15 and the actuator portion 31 will be automatically reclamped by the tab 34 in its newly adjusted position.

Another embodiment for accomplishing the aforenoted type of adjustment is shown in FIGURES 4 and 5. In this embodiment only the construction immediately adjacent the mirror head is shown and it may be assumed that the remaining construction is conventional. Reference may be had to my aforenoted United States Letters Patent for any details of the construction of this embodiment not herein described in detail.

In this embodiment, a mirror glass (not shown) is fixed around the periphery of a frame member, indicated generally by the reference numeral 61. The frame member 61 defines a socket cavity 62 at its central portion which has the shape of a segment of a sphere. The socket cavity 62 receives a complementary surface 63 of a connecting member, indicated generally by the reference numeral 64. The socket cavity 62 is maintained in frictional engagement with the surface 63 by means of a threaded fastener 65 that is threaded into a tapped opening 66 formed centrally in the connecting member 64 and which passes through an enlarged circular aperture 67 formed in the frame socket opening 62. A washer 68 engages the underside of the head of the threaded fastener 65 and the inner surface of the frame member 61 to maintain the members in frictional engagement.

The connecting member 64 is formed with a hemispherical socket cavity 69 that pivotally supports the connecting member 64 and associated mirror frame member 61 upon a complementary projecting portion 71 of a supporting member 72. Three flexible transmitter assemblies having flexible wire actuators 73, 74 and 75 encircled by respective protective sheaths 76, 77 and 78 are provided for positioning the mirror frame 61 and the connecting member 64 to the direction of a signal from a remotely positioned control member (not shown). The wire actuators 73, 74 and 75 are affixed at circumferentially spaced locations in respective openings formed in the connecting member 64, as indicated by the reference numerals 81, 82 and 83. The respective ends of the protective sheaths 76, 77 and 78 are, in turn, fixed in any known manner to the supporting member 72.

Actuation of the control member (not shown) will tension certain of the wire actuators 73, 74 and 75 and exert a compressive force upon the other of these actuators. Normal control forces will cause conjoint pivotal movement of the connecting member 64 and mirror frame 61 due to the frictional engagement between the surfaces 62 and 63. If, however, the control lever and mirror are not centered with respect to each other, one of these members will reach its extreme position before the other member. If this occurs, continued movement of the member which is not at its extreme position will cause the members 61 and 64 to slide with respect to each other to effect adjustment of the type described in the preceding embodiment.

It should be readily apparent that each of the disclosed embodiments provides a connection between a motion transmitting apparatus and a control device that readily permits automatic adjustment and which automatically reconnects the members in the adjusted relationship. In the embodiment shown in FIGURES 1 through 3, the adjustment is accomplished in effect between two wire actuators and the controlled mirror but a similar connection could also be provided between the remaining wire actuator and the mirror. The embodiment shown in FIGURES 4 and 5 permits the adjustment between each of the actuators and the mirror due to the connection to the intermediate connecting member. Various other changes and modifications may be made without departing from the spirit and scope of the invention, as defined by the appended claims.

What is claimed is:

1. A remote control device for transmitting a control signal from a control member to a controlled member and for automatically adjusting the relationship between the members, said remote control device comprising motion transmitting means having an input end and an output end, first coupling means for connecting said input end of said motion transmitting means to the control member, and second coupling means for connecting said output end of said motion transmitting means to the controlled member, said coupling means and said motion transmitting means being effective to transmit control movement from the control member to the controlled member, at least one of said coupling means normally connecting the respective end of said motion transmitting means and the respective member for simultaneous control movement until one of said members reaches an extreme position in its travel, said one coupling means being operative to automatically provide for relative movement between said respective end of said motion transmitting means and said respective member when the one of the members is in its extreme position and upon continued movement of the other member to its respective extreme position for adjusting the relationship between the members.

2. A remote control device as set forth in claim 1 wherein the one coupling means includes components maintained in frictional engagement with each other and which components are automatically reconnected after the adjustment has been effected.

3. A remote control device as set forth in claim 1 wherein the device comprises a remote control automotive rear view mirror, the control member comprises a lever supported for universal pivotal movement and adapted to be positioned within the driver's compartment of the associated vehicle, and the controlled member comprises a mirror supported for universal pivotal movement and adapted to be positioned externally of the associated vehicle.

4. A remote control device as set forth in claim 3 wherein the one coupling means is provided between the motion transmitting means and the mirror.

5. A remote control device as set forth in claim 4 wherein the motion transmitting means comprises a flexible wire actuator.

6. A remote control device as set forth in claim 5 wherein the motion transmitting means comprises three wire actuator assemblies each connected to the control lever at spaced circumferential locations and each connected to the mirror at spaced circumferential locations, the connection between at least two of said wire actuators and said mirror providing for automatic adjustment as defined.

7. A remote control device for transmitting a control signal from a control member to a controlled member, said remote control device comprising a flexible wire actuator, means for connecting the opposite ends of said wire actuator to one of the members, and means for connecting an intermediate portion of said wire actuator to the other of the members.

8. A remote control device as set forth in claim 7 further including first and second protective sheaths, said first protective sheath encircling a portion of the wire actuator from adjacent its connection to the one member to a point spaced from the connection of its intermediate portion to the other member, said second protective sheath encircling a portion of said wire actuator from adjacent its connection to said one member to a point adjacent the connection of its intermediate portion to said other member.

9. A remote control device as set forth in claim 7 wherein the means for connecting the intermediate portion of the wire actuator to the other member comprises a slip connection for transmitting normal control signals from the control member to the controlled member and for permitting relative movement between said intermediate portion and the other of the members when one of the members is in its extreme position and upon continued movement of the other member to its respective extreme position.

10. A remote control device as set forth in claim 9 wherein the slip connection comprises means on the other of the members frictionally engaging the intermediate portion of the wire actuator.

11. A remote control device as set forth in claim 10 wherein the remote control device comprises an automotive rear view mirror, the control member comprises a control lever supported for universal pivotal movement and adapted to be positioned within the driver's compartment of the associated vehicle, and the controlled member comprises a rear view mirror supported for universal pivotal movement and adapted to be mounted on the exterior sheet metal of the associated vehicle.

12. A remote control device as set forth in claim 11 further including a second flexible wire actuator, means for connecting one end of said second wire actuator to the control lever, and means for connecting the other end of said second wire actuator to the mirror.

13. A remote control automotive rear view mirror comprising a control lever adapted to be supported within the driver's compartment of the associated vehicle, means for supporting said control lever for universal pivotal movement, a mirror including a mirror frame, means for pivotally supporting said mirror frame for universal pivotal movement upon the exterior sheet metal of the associated vehicle, a first flexible wire actuator, means for connecting one end of said first wire actuator to said control lever, said first wire actuator having an intermediate portion, said intermediate portion extending through said mirror frame at two circumferentially spaced locations relative to the pivot point of said mirror frame, said mirror frame having an integral tab frictionally engaged with said intermediate portion for holding said intermediate portion in a preassembled relationship to said mirror frame, means for affixing the other end of said first wire actuator to said control lever at a point circumferentially spaced from said one end of said wire actuator, a first protective sheath encircling a portion of the length of said first wire actuator from adjacent said one end to a point adjacent said intermediate portion, a second protective sheath encircling a portion of said first wire actuator from adjacent said other end to a point adjacent said intermediate portion, a second flexible wire actuator, means for affixing one end of said second wire actuator to said control lever at a point spaced from the ends of said first wire actuator, means for connecting the other end of said second wire actuator to said mirror frame, and a third protective sheath encircling said second wire actuator between said ends.

14. A self-adjusting remote control device comprising a member adapted to be supported for control movement, a coupling member, motion transmitting means, means operatively connecting said motion transmitting means to said coupling member for transmitting control movement between said coupling member and said motion transmitting means, and means operatively connecting said coupling member to the first mentioned member, said operative connecting means providing for simultaneous movement between said coupling member and said first member under normal control conditions and providing for relative movement of said coupling member and said first member for adjustment in the relative positions of said first member and said coupling member.

15. A self adjusting remote control device as set forth in claim 14 wherein the operative connecting means includes components maintained in frictional engagement, said components being adapted to move with respect to each other for adjustment of the relative positions of the first member and the coupling member.

16. A self adjusting remote control device comprising a supporting member, a coupling member supported for universal pivotal movement upon said supporting member, a controlled member, means providing a ball and socket connection between said controlled member and said coupling member, fastening means for maintaining said ball and socket connection in frictional engagement for simultaneous movement of said controlled member and said coupling member and for permitting relative movement between said controlled member and said coupling member for effecting adjustment therebetween, and a plurality of flexible transmitters affixed to said coupling member at points spaced from its pivotal axis for adjusting the position of said coupling member and said controlled member.

17. A self adjusting remote control device as set forth in claim 16 wherein the remote control device comprises an automotive rear view mirror, the controlled member comprising a mirror frame, and further including a control member comprised of a lever supported for universal pivotal movement and means operatively connecting said control lever to the flexible wire actuators for adjusting the position of said mirror frame.

References Cited
UNITED STATES PATENTS

| | | | |
|---|---|---|---|
| 3,183,736 | 5/1965 | Jacobson. | |
| 3,253,481 | 5/1966 | Warhol. | |
| 3,352,524 | 11/1967 | Rossi | 74—501 X |
| 3,370,479 | 2/1968 | Van Noord | 74—501 |
| 3,370,480 | 2/1968 | Gionet et al. | 74—501 |

DONLEY J. STOCKING, *Primary Examiner.*

L. H. GERIN, *Assistant Examiner.*